United States Patent
Hasberg et al.

(10) Patent No.: US 11,315,279 B2
(45) Date of Patent: Apr. 26, 2022

(54) METHOD FOR TRAINING A NEURAL CONVOLUTIONAL NETWORK FOR DETERMINING A LOCALIZATION POSE

(71) Applicant: Robert Bosch GmbH, Stuttgart (DE)

(72) Inventors: Carsten Hasberg, Ilsfeld-Auenstein (DE); Piyapat Saranrittichai, Korntal-Muenchingen (DE); Tayyab Naseer, London (GB)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 17/026,796

(22) Filed: Sep. 21, 2020

(65) Prior Publication Data
US 2021/0125366 A1   Apr. 29, 2021

(30) Foreign Application Priority Data
Oct. 24, 2019   (DE) .......................... 102019216379.3

(51) Int. Cl.
| | |
|---|---|
| *G06K 9/00* | (2022.01) |
| *G06T 7/70* | (2017.01) |
| *G01C 11/06* | (2006.01) |
| *G05D 1/02* | (2020.01) |
| *G06N 3/08* | (2006.01) |

(52) U.S. Cl.
CPC .............. *G06T 7/70* (2017.01); *G01C 11/06* (2013.01); *G05D 1/0221* (2013.01); *G06N 3/08* (2013.01); *G05D 2201/0208* (2013.01); *G05D 2201/0215* (2013.01); *G06T 2207/10032* (2013.01); *G06T 2207/20081* (2013.01); *G06T 2207/20084* (2013.01); *G06T 2207/30181* (2013.01); *G06T 2207/30252* (2013.01)

(58) Field of Classification Search
CPC ............ G06T 7/70; G06T 2207/10032; G06T 2207/20081; G06T 2207/20084; G06T 2207/30181; G06T 2207/30252; G06T 2207/30244; G06T 7/74; G06T 1/20; G01C 11/06; G01C 21/20; G05D 1/0221; G05D 2201/0208; G05D 2201/0215; G05D 1/0088; G05D 1/0246; G06N 3/08
USPC ......................................................... 382/103
See application file for complete search history.

(56) References Cited

U.S. PATENT DOCUMENTS

| | | | |
|---|---|---|---|
| 10,771,748 B2* | 9/2020 | Hong | H04N 5/23238 |
| 2020/0232963 A1* | 7/2020 | Zelinski | G01N 21/3504 |
| 2021/0407128 A1* | 12/2021 | Urfalioglu | G06T 7/74 |

* cited by examiner

*Primary Examiner* — Charlotte M Baker
(74) *Attorney, Agent, or Firm* — Norton Rose Fulbright US LLP; Gerard Messina

(57) ABSTRACT

A method for training a neural convolutional network for determining, with the aid of the neural convolutional network, a localization pose of a mobile platform using a ground image. Using a first multitude of aerial image training cycles, each aerial image training cycle includes: providing a reference pose of the mobile platform; and providing an aerial image of the environment of the mobile platform in the reference pose; using the aerial image as an input signal of the neural convolutional network; determining the respective localization pose with the aid of an output signal of the neural convolutional network; and adapting the neural convolutional network to minimize a deviation of the respective localization pose determined using the respective aerial image from the respective reference pose.

15 Claims, 1 Drawing Sheet

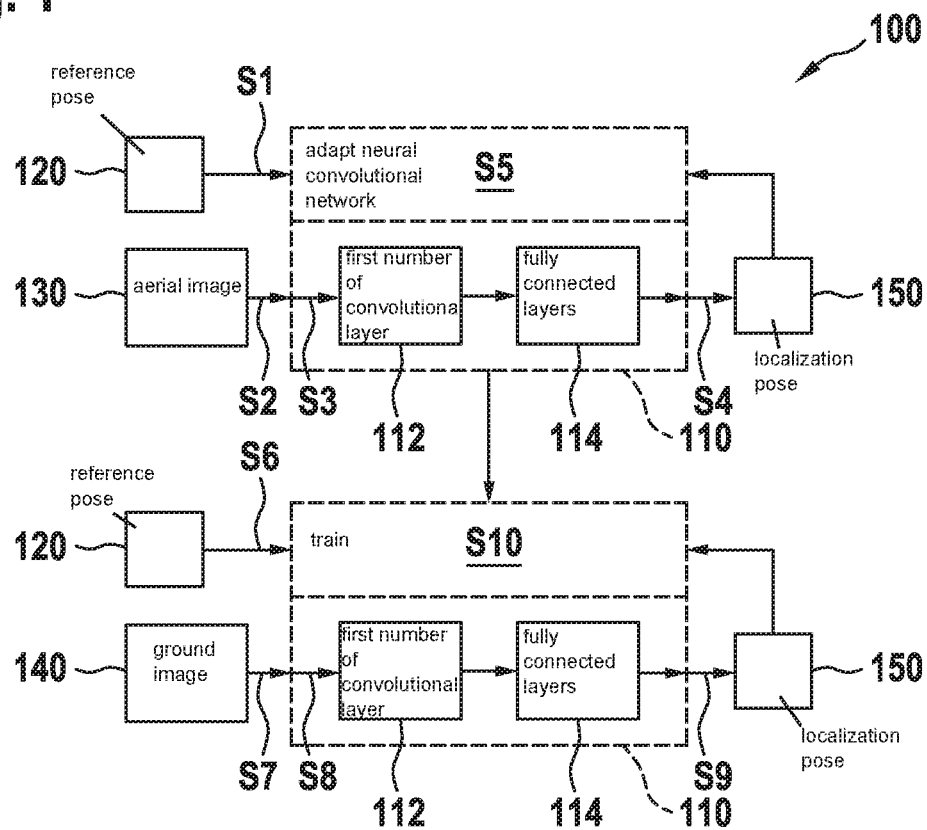
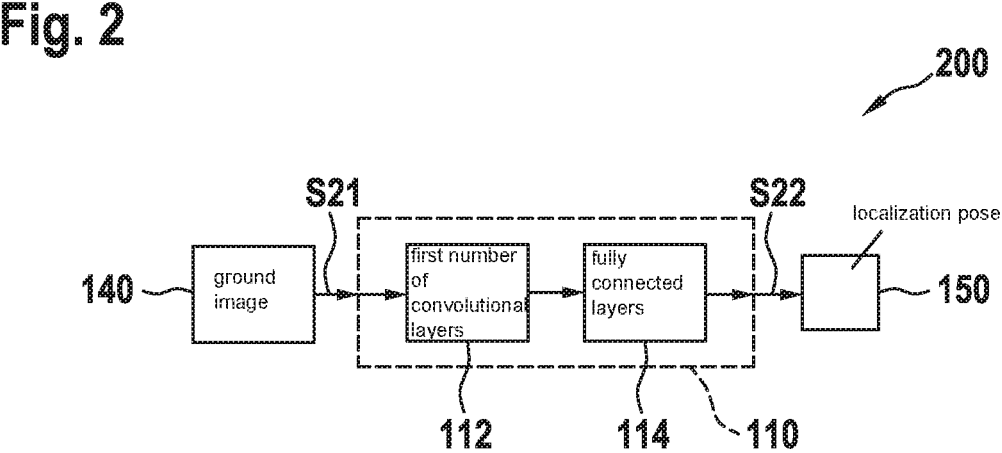

METHOD FOR TRAINING A NEURAL CONVOLUTIONAL NETWORK FOR DETERMINING A LOCALIZATION POSE

CROSS REFERENCE

The present application claims the benefit under 35 U.S.C. § 119 of German Patent Application No. 102019216379.3 filed on Oct. 24, 2019, which is expressly incorporated herein by reference in its entirety.

FIELD

The present invention relates to a method for training a neural convolutional network for determining a localization pose of a mobile platform with the aid of the neural convolutional network using a ground image.

BACKGROUND INFORMATION

A precise localization is a prerequisite for driving an at least partially automated platform such as autonomously operated vehicles.

For a localization of such a mobile platform with the aid of ground images of the environment of this mobile platform, a number of different approaches have been pursued, which are typically based on features in relation to the environment of the mobile platform, these features then being allocated to a pose of the mobile platform via a high-resolution map.

SUMMARY

However, the use of such a highly resolving map entails economic disadvantages. Deep learning-based methods for the determination of a pose using a regression on the basis of ground images, on the other hand, have the advantage of a specified size of a corresponding map and a constant query time. Such methods make it possible to determine a localization using monocular images, video image sequences and depth images from the direct camera position. A localization in a very large geographical region poses a challenge with regard to an unambiguity of a determination of a pose.

The present invention provides a method for training a neural convolutional network for a determination of a localization pose of a mobile platform using a ground image, a method for determining a localization pose, a method for actuating a mobile platform, a computer program, as well as a machine-readable memory medium according to the features of the independent claims. Advantageous further developments of the present invention are described herein.

In accordance with the present invention, a spatial context and a perspective of the environment of a mobile platform using aerial images, which are centered around an estimated position of the mobile platform, for instance, can be used to train, together with ground images, a neural network to determine a pose of the mobile platform. In particular, this may make it possible to correctly allocate ambiguous features from ground images across a larger geographical region.

According to one aspect of the present invention, a method for training a neural convolutional network is provided for determining with the aid of the neural convolutional network a localization pose of a mobile platform using a ground image.

In accordance with an example embodiment of the present invention, the method has a first multitude of aerial image training cycles, each aerial image training cycle having the following steps:

In one step of an aerial image training cycle, a reference pose of the mobile platform is provided. In a further step, an aerial image of the environment of the mobile platform in the reference pose is provided. In another step, the aerial image is used as an input signal of the neural convolutional network. In a further step, the respective localization pose is determined with the aid of an output signal of the neural convolutional network. In an additional step, the neural convolutional network is adapted in order to minimize a deviation of the respective localization pose, determined using the respective aerial image, from the respective reference pose.

In further steps, the method trains the neural convolutional network trained using the first multitude of aerial image training cycles, with a second multitude of ground image training cycles, each ground image training cycle having the following steps.

In one step, a reference pose of the mobile platform is provided. In a further step, a ground image of the environment of the mobile platform in the reference pose is provided. In another step, the ground image is used as an input signal of the neural convolutional network trained using the first multitude of aerial image training cycles. In another step, the localization pose is determined with the aid of the output signal of the neural convolutional network. In a further step, the neural convolutional network is adapted in order to minimize a deviation of the respective localization pose determined using the respective ground image, from the respective reference pose in order to provide a trained neural convolutional network for determining a localization pose using a ground image. For this method, an untrained neural convolutional network as described in the following text is able to be made available for the first aerial image training cycle.

In this method, different reference poses of different environments of the mobile platform and correspondingly different aerial images are advantageously provided in this method for the individual aerial image training cycles of the first multitude of aerial image training cycles.

This method advantageously makes it possible to determine a localization pose using visual ground images and visual aerial images of the environment of the mobile platform without the use of a high-resolution map. In other words, aerial images are used for pre-training the neural convolutional network for determining a localization pose of the mobile platform. Since this method is not based on handmade features, it is easily scalable with regard to larger geographical regions.

The use of the ground image or the aerial image as an input signal of the neural network means that the ground image or the aerial image is transferred to the input layer of the neural network.

The ground image is typically generated by a front camera of the mobile platform using the corresponding perspective with the aid of a digital camera system.

In this example method, the neural convolutional network is provided both with a ground image, e.g., an RGB image from the front camera of a mobile platform, and an aerial image, e.g., a satellite image.

Because the neural convolutional network is pre-trained using a first multitude of aerial image training cycles, the subsequent training using a second multitude of ground image training cycles makes it possible to disambiguate ground images that look very similar but are spatially located far from one another. In other words, the convolutional network is first trained using a first multitude of aerial image training cycles and then successively trained using a second multitude of ground image training cycles. The supplied aerial images of the first multitude of aerial image training cycles may correspond to the ground images of the second multitude of ground image training cycles in the sense that the geographical information included in the aerial images and the ground images in their totality supplement one another for a determination of a pose of the mobile platform and/or interact with one another in order to improve the determination of the pose. This interaction and/or supplementation may in particular pertain to aerial images and ground images that represent a similar geographical region. However, a discriminating effect may also be achieved by different geographical regions of the aerial images and the ground images.

By considering the aerial images of the environment of the mobile platform by the pre-training, the neural convolutional network is trained to learn discriminating features through the distinct spatial arrangement of features of the aerial image, while the localization pose is additionally able to be determined more accurately.

To allow the vehicle position or the vehicle localization pose to be determined with high accuracy, the pose of a mobile platform is derived from the provided ground images together with the corresponding local aerial images and/or local satellite images as opposed to comparing the similarity of ground images and aerial images such as at least local parts of satellite images.

End-to-end learning is therefore carried out, which is based on ground images and aerial images in order to achieve satisfactory scalability. The advantage of position precursors with regard to excellent scalability is thus combined with the advantages of the use of neural convolutional networks.

A neural convolutional network has filter (convolutional layer) and aggregation layers (pooling layer), which repeat in alternation, and may have one or a plurality of layer(s) of "normal", fully connected neurons (dense/fully connected layer) at the end of the network.

In accordance with the present invention, the first and the second trained neural encoder convolutional network part may be developed as part of a neural convolutional network, or these network parts are able to be realized in the form of individual neural convolutional networks in each case.

Both the ground image and the aerial image may be present in the form of a digital image from different perspectives of the environment of the mobile platform and be generated with the aid of digital camera systems, for example. The perspective of the aerial image of the environment of the mobile platform is a top down view. Such an aerial image is able to be generated by camera systems of satellites, airplanes or drones, for example.

An aerial image of this type may be both an individually produced aerial image of the environment of the mobile platform and a section of a larger aerial image, for instance, the section in particular being centered around an estimated pose of the mobile platform. Such an aerial image may particularly be a satellite image tile, which is able to be called up for a particular satellite navigation position, e.g., a GPS position.

A localization pose of the mobile platform is a pose, i.e. a definition of a position having three dimensions in space and an orientation of the mobile platform in space, which is able to be specified by three Euler angles, for instance, determined by this method.

A reference pose of the mobile platform is a pose that provides highly precise information for training the determination of the localization pose of this method, for instance by a reference system for the determination of the pose of the mobile platform.

A feed forward neural network provides a framework for many different algorithms for machine learning, for interacting and for processing complex data inputs. Such neural networks learn to carry out tasks on the basis of examples without typically having been programmed with task-specific rules.

Such a neural network is based on a collection of connected units or nodes, which are known as artificial neurons. Each connection is able to transmit a signal from one artificial neuron to another. An artificial neuron receiving a signal is able to process the signal and then use it to activate further artificial neurons connected thereto.

In conventional implementations of neural networks, the signal at a connection of artificial neurons is a real number, and the output of an artificial neuron is calculated with the aid of a non-linear function of the sum of its inputs. The connections of the artificial neurons typically have a weight that adapts itself as the learning progresses. The weight increases or decreases the intensity of the signal at a connection. Artificial neurons may have a threshold so that a signal is output only if the total signal exceeds this threshold. A multitude of artificial neurons is typically combined into layers. Different layers possibly perform different types of transformations for their inputs. Signals travel from the first layer, the input layer, to the last layer, the output layer, possibly after cycling through the layers multiple times.

In addition to the comments regarding the feed forward neural network in the previous text, the structure of an artificial neural convolutional network is made up of one or a plurality of convolutional layers, possibly followed by a pooling layer. The sequence of layers is able to be used with or without normalization layers (e.g., batch normalization), zero padding layers, dropout layers, and activating functions such as rectified linear unit ReLU, sigmoid function, tank function or softmax function. These units may basically repeat themselves as often as needed; given a sufficient number of repetitions, this is then referred to as deep neural networks.

For the training of such a defined structure of the neural encoder-decoder convolutional network, each neuron is given a random starting weight, for example. The input data are then input into the network, and each neuron weights the input signals by its weight and forwards the result to the neurons of the next layer. A result is provided at the output layer. The magnitude of the error is able to be calculated as well as the share each neuron contributed to this error, and the weight of each neuron may then be modified in the direction that minimizes the error. This is followed by recursive cycles, renewed measurements of the error and an adaptation of the weights until the error lies below a predefined limit.

In the description herein of the present invention, the sequence of method steps is illustrated in a way that makes the method easy to understand. However, one skilled in the art will recognize that many of the method steps are also able to be cycled through in a different sequence while achieving the same result. In this sense, the sequence of the method steps may be changed accordingly and is consequently disclosed as well.

A mobile platform may be understood as an at least partially automated system, which is mobile, and/or as a driver assistance system of a vehicle. One example may be an at least partially automated vehicle or a vehicle having a driver assistance system. In this context, this means that an at least partially automated system includes a mobile platform with regard to an at least partially automated functionality, but a mobile platform also includes vehicles and other mobile machines including driver assistance systems. Additional examples of mobile platforms could be driver assistance systems having multiple sensors, mobile multi-sensor robots such as robot vacuum cleaners or lawn mowers, a multi-sensor monitoring system, a production machine, a personal assistant, a shuttle, a robot taxi, a boat, an airplane, utility vehicles or an access control system. Each one of these systems may be a fully or partially automated system.

According to one aspect of the present invention, it is provided that the first multitude of aerial image training cycles is defined in that a deviation of the respective determined localization pose from the respective reference pose is smaller than a predefined first value.

In this way, it is then possible to specify the desired accuracy of the determination of the localization pose in the first part of the method using the first multitude of aerial image training cycles and/or to specify an abort criterion for the first multitude of aerial image training cycles.

According to one aspect of the present invention, it is provided that the second multitude of aerial image training cycles is defined in that a deviation between the respective determined localization pose and the respective reference pose is smaller than a predefined second value.

This makes it possible to specify the desired accuracy of the determination of the localization pose in the second part of the method using the second multitude of ground image training cycles and/or to define an abort criterion for the second multitude of ground image training cycles.

According to one aspect of the present invention, it is provided that the neural convolutional network to be trained is a neural encoder convolutional network or an encoder network.

According to one aspect of the present invention, it is provided that the aerial image for the method for training and also the method for determining a localization pose of the environment of the mobile platform is generated with the aid of a satellite, an airplane or a drone.

According to one aspect of the present invention, it is provided that the aerial image is selected with the aid of a pose that was determined by a global navigation system and/or a mobile-radio-supported navigation system.

Because of this position specification with the aid of a navigation system, a search area for features is able to be reduced and the determination of the poses with the aid of the ground images is able to be estimated more precisely using a reduced data volume.

According to one aspect of the present invention, it is provided that weights of the neural convolutional network are modified in at least some of the training cycles during the adaptation of the neural convolutional network in order to minimize a deviation between the respective localization pose and the respective reference pose.

According to one aspect of the present invention, it is provided that during the adaptation of the neural convolutional network trained using the first multitude of aerial image training cycles, weights of the neural convolutional network trained using the first multitude of aerial image training cycles are modified in at least some of the training cycles in order to minimize a deviation of the respective localization pose from the respective reference pose.

In accordance with an example embodiment of the present invention, a method is provided for determining a localization pose of a mobile platform, in which the mobile platform is developed to generate ground images of an environment of the mobile platform. In one step of this method, a ground image of the environment of the mobile platform is supplied. In a further step, a localization pose of the mobile platform is generated as an input signal of the successively trained neural convolutional network with the aid of a neural convolutional network successively trained using aerial images and corresponding ground images of a respective environment of mobile platforms and the supplied ground image.

The example method is based on a neural convolutional network successively trained using aerial images and corresponding ground images of a respective environment of mobile platforms. As a result, features from a larger spatial context, e.g., from an aerial image, may advantageously be incorporated into the training of the neural convolutional network in the two-stage training of the neural network with the aerial image training cycles and the ground image training cycles switched one after the other in an effort to achieve greater accuracy in the determination of the localization pose of the mobile platform.

The example method for determining the localization pose of the mobile platform is able to be combined with different existing methods in order to improve the determination of the pose. In particular, for example, this is an integration of sequential information and a consideration of geometrical limitations, which may lead to a further output gain.

Advantages of the example method include the scalability of the application of the method because both contextual information and large-area localization information are taken into account in the method. In addition, a constant query time for the pose determination results in this method, which is not the case in conventional, feature-based methods. For example, no satisfactory scaling is achieved with a 3D-3D/2D-3D feature matching in the case of large map sizes.

A fixed "map size" results with the example method because the map is implicitly represented by the weights of the adjusted and stored network.

In addition, the example method uses publicly accessible information for a first estimated pose, and satellite images, for instance, are able to be used for the aerial images, which are economically advantageous and do not require any manual characterization.

According to one aspect of the present invention, it is provided that the neural convolutional network successively trained using aerial images and corresponding ground images of the respective environment of mobile platforms is trained according to one of the afore-described methods for training a neural convolutional network.

According to one aspect of the present invention, it is provided that the digital ground image is made available by the mobile platform.

According to one aspect of the present invention, it is provided that the neural convolutional network generates an output signal when a pose of a mobile platform is determined, and the output signal has values for a determination of the localization pose.

According to one aspect of the present invention, it is provided that the neural convolutional network has a fully connected network layer. In fully connected layers, the neurons of one layer are connected to all neurons of the subsequent layer and are thus referred to as 'fully connected layer' (also 'dense layer'). There are then as many weights of the neural layer as there are connections.

According to one aspect of the present invention, it is provided that the neural convolutional network is a neural encoder convolutional network.

According to one aspect of the present invention, it is provided that the ground image of the environment of the mobile platform is a digital ground image.

According to one aspect of the present invention, it is provided that the ground image of the environment of the mobile platform has been generated with the aid of a digital camera system.

The use of digital camera systems has the advantage that the digital images generated in the process can be easily further processed.

According to one aspect of the present invention, it is provided that the ground image of the environment of the mobile platform is generated with the aid of a front camera of the mobile platform from the perspective of the mobile platform.

According to one aspect of the present invention, it is provided that a control signal for actuating an at least partially automated mobile platform is provided based on a localization pose, and/or that a warning signal for warning a passenger of the at least partially automated mobile platform is provided based on the localization pose.

The term 'based on' as it pertains to the feature that a control signal is supplied based on the localization pose has a broad meaning. It should be understood in such a way that the localization pose is utilized for any determination or calculation of a control signal; however, this does not exclude that still further input variables are used for this determination of the control signal. The same analogously applies to the supply of a warning signal.

In accordance with an example embodiment of the present invention, a device is provided, which is developed to carry out one of the afore-described methods. With the aid of such a device, the present method is easily able to be integrated into different systems.

In accordance with an example embodiment of the present invention, a computer program is provided, which when the program is executed on a computer, induces the computer to carry out one of the afore-described methods. Such a computer program makes it possible to use the described method in different systems.

In accordance with an example embodiment of the present invention, an example machine-readable memory medium is provided in which the afore-described computer program is stored.

BRIEF DESCRIPTION OF THE DRAWINGS

Exemplary embodiments of the present invention are shown with reference to the Figures and are described in greater detail below.

FIG. 1 shows a flow diagram of a method for training a neural convolutional network for determining a localization pose in accordance with an example embodiment of the present invention.

FIG. 2 shows a flow diagram of a method for determining a localization pose of an at least partially automated mobile platform, in accordance with an example embodiment of the present invention.

DETAILED DESCRIPTION OF EXAMPLE EMBODIMENTS

FIG. 1, using a data flow diagram, schematically shows a method 100 for training a neural convolutional network 110 for determining a localization pose (150) of a mobile platform using a ground image (140) with the aid of a neural convolutional network (110) in accordance with an example embodiment of the present invention. Method 100 has a first multitude of aerial image training cycles, each aerial image training cycle having the following steps: In a step S1 of an aerial image training cycle, a reference pose 120 of the mobile platform is provided. In a further step S2, an aerial image 130 of the environment of the mobile platform in reference pose 120 is provided. In a further step S3, aerial image 130 is used as an input signal of neural convolutional network 110. In another step S4, respective localization pose 150 is determined with the aid of an output signal of neural convolutional network 110. In an additional step S5, neural convolutional network 110 is adapted in order to minimize a deviation of the respective localization pose 150 determined by respective aerial image 130 from respective reference pose 120. In further steps, method 100 trains neural convolutional network 110 trained using the first multitude of aerial image training cycles with a second multitude of ground image training cycles, each ground image training cycle having the following steps:

In a step S6, a reference pose 120 of the mobile platform is provided. In another step S7, a ground image 140 of the environment of the mobile platform in reference pose 120 is supplied. In an additional step S8, ground image 140 is used as an input signal of neural convolutional network 110. In a further step S9, localization pose 150 is determined with the aid of the output signal of neural convolutional network 110. In a further step S10, in order to minimize a deviation between the respective localization pose 150 determined using respective ground image 140, and respective reference pose 120, neural convolutional network 110 trained using the first multitude of aerial image training cycles is adapted in order to provide a trained neural convolutional network 110 for a determination of a localization pose 150 using a ground image 140. Neural convolutional network 110 may have a first number of convolutional layers 112 and a second number of fully connected layers 114. The second number of fully connected layers 114 in the layer sequence of neural convolutional network 110 may follow the first number of convolutional layers 112.

FIG. 2, using a data flow diagram, schematically shows method 200 for determining a localization pose 150 of a mobile platform in accordance with an example embodiment of the present invention, the mobile platform being configured to generate ground images 140 of an environment of the mobile platform. In this method, a ground image 140 of the environment of the mobile platform is supplied in a step S21. In a further step S22, a localization pose 150 of the mobile platform is generated as an input signal of the successively trained neural convolutional network 110 with the aid of a neural convolutional network 110 successively trained using aerial images 130 and corresponding ground images 140 of a respective environment of mobile platforms and using supplied ground image 140.

Neural convolutional network 110 successively trained using aerial images 130 and corresponding ground images 140 of the respective environment of mobile platforms may have been trained according to method 100 described in FIG. 1.

What is claimed is:

1. A method for training a neural convolutional network for determining, using the neural convolutional network, a localization pose of a mobile platform using a ground image, the method comprising the following steps:
performing a first multitude of aerial image training cycles, each of the aerial image training cycles including the following steps:
providing a respective reference pose of the mobile platform,
providing an aerial image of an environment of the mobile platform in the respective reference pose,
using the aerial image as an input signal of the neural convolutional network,
determining a respective localization pose using an output signal of the neural convolutional network, and
adapting the neural convolutional network to minimize a deviation of the respective localization pose determined using the respective aerial image, from the respective reference pose; and
training the neural convolutional network trained using the first multitude of aerial image training cycles, with a second multitude of ground image training cycles, each of the ground image training cycles including the following steps:
providing a second respective reference pose of the mobile platform;
providing a respective ground image of the environment of the mobile platform in the second respective reference pose;
using the respective ground image as an input signal of the neural convolutional network trained using the first multitude of aerial image training cycles;
determining a second respective localization pose using an output signal of the neural convolutional network; and
adapting the neural convolutional network to minimize a deviation of the second respective localization pose determined using the respective ground image, from the second respective reference pose to provide a trained neural convolutional network for determining a localization pose using a ground image.

2. The method as recited in claim 1, wherein the first multitude of aerial image training cycles is defined in that a deviation of the respective determined localization pose from the respective reference pose is smaller than a predefined first value.

3. The method as recited in claim 1, wherein the second multitude of aerial image training cycles is defined in that a deviation of the second respective determined localization pose from the second respective reference pose is smaller than a predefined second value.

4. The method as recited in claim 1, wherein the aerial image of the environment of the mobile platform is generated using a satellite, or an airplane, or a drone.

5. The method as recited in claim 1, wherein the aerial image is selected using a pose that was determined using a global navigation system and/or a mobile-radio-supported navigation system.

6. A method for determining a localization pose of a mobile platform, the mobile platform being configured to generate ground images of an environment of the mobile platform, the method comprising the following steps:
supplying a ground image of the environment of the mobile platform; and
generating a localization pose of the mobile platform as an input signal of a successively trained neural convolutional network, using a neural convolutional network successively trained using aerial images and corresponding ground images of a respective environment of mobile platforms, and the supplied ground image.

7. The method as recited in claim 6, wherein the neural convolutional network successively trained using aerial images and corresponding ground images of the respective environment of mobile platforms, is trained by:
performing a first multitude of aerial image training cycles, each of the aerial image training cycles including the following steps:
providing a respective reference pose of the mobile platform,
providing an aerial image of an environment of the mobile platform in the respective reference pose,
using the aerial image as an input signal of the neural convolutional network,
determining a respective localization pose using an output signal of the neural convolutional network, and
adapting the neural convolutional network to minimize a deviation of the respective localization pose determined using the respective aerial image, from the respective reference pose; and
training the neural convolutional network trained using the first multitude of aerial image training cycles, with a second multitude of ground image training cycles, each of the ground image training cycles including the following steps:
providing a second respective reference pose of the mobile platform,
providing a respective ground image of the environment of the mobile platform in the second respective reference pose,
using the respective ground image as an input signal of the neural convolutional network trained using the first multitude of aerial image training cycles,
determining a second respective localization pose using an output signal of the neural convolutional network, and
adapting the neural convolutional network to minimize a deviation of the second respective localization pose determined using the respective ground image, from the second respective reference pose to provide a trained neural convolutional network for determining a localization pose using a ground image.

8. The method as recited in claim 6, wherein the digital ground image is made available by the mobile platform.

9. The method as recited in claim 6, wherein the neural convolutional network generates an output signal, and the output signal has values for a determination of the localization pose.

10. The method as recited in claim 6, wherein the neural convolutional network is a neural encoder convolutional network.

11. The method as recited in claim 6, wherein the ground image of the environment of the mobile platform is generated using a front camera of the mobile platform from a perspective of the mobile platform.

12. The method as recited in claim 6, further comprising the following steps:
providing a control signal for actuating an at least partially automated mobile platform based the localization pose, and/or providing a warning signal for warning a passenger of the at least partially automated mobile platform based on the localization pose.

13. A device configured to train a neural convolutional network for determining, using the neural convolutional network, a localization pose of a mobile platform using a ground image, the device configured to:
perform a first multitude of aerial image training cycles, for each of the aerial image training cycles, the device is configured to:
provide a respective reference pose of the mobile platform,
provide an aerial image of an environment of the mobile platform in the respective reference pose,
use the aerial image as an input signal of the neural convolutional network,
determine a respective localization pose using an output signal of the neural convolutional network, and
adapt the neural convolutional network to minimize a deviation of the respective localization pose determined using the respective aerial image, from the respective reference pose; and
train the neural convolutional network trained using the first multitude of aerial image training cycles, with a second multitude of ground image training cycles, for each of the ground image training cycles, the device being configured to:
provide a second respective reference pose of the mobile platform,
provide a respective ground image of the environment of the mobile platform in the second respective reference pose,
use the respective ground image as an input signal of the neural convolutional network trained using the first multitude of aerial image training cycles,
determine a second respective localization pose using an output signal of the neural convolutional network, and
adapt the neural convolutional network to minimize a deviation of the second respective localization pose determined using the respective ground image, from the second respective reference pose to provide a trained neural convolutional network for determining a localization pose using a ground image.

14. A non-transitory machine-readable memory medium on which is stored a computer program for training a neural convolutional network for determining, using the neural convolutional network, a localization pose of a mobile platform using a ground image, the computer program, when executed by a computer, causing the computer to perform the following steps:
performing a first multitude of aerial image training cycles, each of the aerial image training cycles including the following steps:
providing a respective reference pose of the mobile platform,
providing an aerial image of an environment of the mobile platform in the respective reference pose,
using the aerial image as an input signal of the neural convolutional network,
determining a respective localization pose using an output signal of the neural convolutional network, and
adapting the neural convolutional network to minimize a deviation of the respective localization pose determined using the respective aerial image, from the respective reference pose; and
training the neural convolutional network trained using the first multitude of aerial image training cycles, with a second multitude of ground image training cycles, each of the ground image training cycles including the following steps:
providing a second respective reference pose of the mobile platform,
providing a respective ground image of the environment of the mobile platform in the second respective reference pose,
using the respective ground image as an input signal of the neural convolutional network trained using the first multitude of aerial image training cycles,
determining a second respective localization pose using an output signal of the neural convolutional network, and
adapting the neural convolutional network to minimize a deviation of the second respective localization pose determined using the respective ground image, from the second respective reference pose to provide a trained neural convolutional network for determining a localization pose using a ground image.

15. A non-transitory machine-readable memory medium on which is stored a computer program for determining a localization pose of a mobile platform, the mobile platform being configured to generate ground images of an environment of the mobile platform, the computer program, when executed by a computer, causing the computer to perform the following steps:
supplying a ground image of the environment of the mobile platform; and
generating a localization pose of the mobile platform as an input signal of a successively trained neural convolutional network, using a neural convolutional network successively trained using aerial images and corresponding ground images of a respective environment of mobile platforms, and the supplied ground image.

* * * * *